United States Patent
Wu et al.

(10) Patent No.: US 11,757,301 B2
(45) Date of Patent: Sep. 12, 2023

(54) CARRIERS SYNCHRONIZING METHOD OF HYBRID FREQUENCY PARALLEL INVERTER AND SYSTEM THEREOF

(71) Applicant: NATIONAL TSING HUA UNIVERSITY, Hsinchu (TW)

(72) Inventors: Tsai-Fu Wu, Hsinchu (TW); Temir Sakavov, Hsinchu (TW); Yen-Hsiang Huang, Hsinchu (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 0 days.

(21) Appl. No.: 17/653,459

(22) Filed: Mar. 3, 2022

(65) Prior Publication Data

US 2023/0124942 A1    Apr. 20, 2023

(30) Foreign Application Priority Data

Sep. 24, 2021   (TW) .................................. 110135694

(51) Int. Cl.
*H02J 9/06* (2006.01)
*H02M 7/493* (2007.01)
*H02J 13/00* (2006.01)

(52) U.S. Cl.
CPC .................. *H02J 9/062* (2013.01); *H02J 9/068* (2020.01); *H02M 7/493* (2013.01); *H02J 13/00032* (2020.01)

(58) Field of Classification Search
CPC ........... H02J 9/062; H02J 9/068; H02M 7/493; H02J 13/00032
See application file for complete search history.

(56) References Cited

U.S. PATENT DOCUMENTS

| | | | |
|---|---|---|---|
| 2011/0278934 A1 | 11/2011 | Ghosh et al. | |
| 2014/0103725 A1 | 4/2014 | Ghosh et al. | |
| 2018/0076656 A1 | 3/2018 | Nishimura et al. | |
| 2018/0076657 A1 | 3/2018 | Nishimura et al. | |
| 2019/0074779 A1* | 3/2019 | Frampton et al. | H02P 9/14 |
| 2020/0144934 A1* | 5/2020 | Chen et al. | H02M 7/53803 |
| 2020/0259438 A1* | 8/2020 | Wang | H02P 23/28 |
| 2021/0152106 A1 | 5/2021 | Frampton et al. | |

FOREIGN PATENT DOCUMENTS

| | | | |
|---|---|---|---|
| TW | 201131927 | A | 9/2011 |
| TW | I628890 | B | 7/2018 |
| TW | I710207 | B | 11/2020 |
| WO | 2011022320 | A1 | 2/2011 |

* cited by examiner

*Primary Examiner* — Rexford N Barnie
*Assistant Examiner* — Thai H Tran
(74) *Attorney, Agent, or Firm* — CKC & Partners Co., LLC

(57) ABSTRACT

A carriers synchronizing method of a hybrid frequency parallel inverter is proposed. A low-frequency ripple simulating step is performed to drive a high-frequency controlling unit to simulate a low-frequency ripple. An equidistant grid sampling step is performed to drive the high-frequency controlling unit to sample a sample ripple to generate a sample group and sample the low-frequency ripple to generate a plurality of low-frequency reference groups. An actual shifting angle searching step is performed to drive the high-frequency controlling unit to compare the sample group with the low-frequency reference groups to search an actual shifting angle from the reference shifting angles. A high-frequency carrier adjusting step is performed to drive a proportional integral controller to calculate the actual shifting angle to generate a sync reference, and then a period counter adjusts a starting point of the high-frequency carrier according to the sync reference.

14 Claims, 9 Drawing Sheets

CARRIERS SYNCHRONIZING METHOD OF HYBRID FREQUENCY PARALLEL INVERTER AND SYSTEM THEREOF

RELATED APPLICATIONS

This application claims priority to Taiwan Application Serial Number 110135694, filed Sep. 24, 2021, which is herein incorporated by reference.

BACKGROUND

Technical Field

The present disclosure relates to a carriers synchronizing method and a system thereof. More particularly, the present disclosure relates to a carriers synchronizing method of a hybrid frequency parallel inverter applied to an Uninterruptible Power System (UPS) and a system thereof.

Description of Related Art

In modern times, natural resources are becoming scarce, electricity demand is increasing, and non-sustainable power generating methods based on fossil fuel usage such as coal, oil and natural gas have caused many environmental problems. The development of sustainable green energy has become an international trend which is driving the rapid development of distributed generation and power electronics. Most green energy converting devices operate on a grid for improving the stability of the distributed generation system. When a problem occurs on the grid side, how to maintain the energy of the distributed generation system and give the load energy in time until the grid restores stability requires the assistance of an Uninterruptible Power System (UPS).

With the power increase of a hybrid frequency parallel inverter applied to the UPS, in order to set system to compensate a ripple current of the low-frequency high power inverter is that the driving signal (i.e., Pulse-Width Modulation (PWM) signal) of the low-frequency high power inverter and the driving signal of the high-frequency low power inverter must be synchronized. The conventional synchronizing method uses the low-frequency high power inverter as the main inverter. The controller of the low-frequency high power inverter sends a synchronizing signal to the controller that controls the high-frequency low power inverter through a signal line, and the driving signal of the controller will be synchronized from the wave peak.

However, the extra signal line may cause interference between two separate control systems and requires to take into account parasitic parameters of communication line that cause signal delay. If the signal delay needs to be compensated, it is necessary to manually correct the timing, which makes the system complicated. If the high and low-frequency controllers are still working at hybrid frequencies, it means an additional source of noise for both controllers. In addition, the extra signal line can become an antenna and be prone to pick up noise from ambient, thereby affecting the logic judgment of the high and low frequency controllers. Therefore, the conventional synchronizing method makes the system unreliable and complicated.

In view of the problems of the conventional synchronizing method, how to establish a carriers synchronizing method of the hybrid frequency parallel inverter that avoids using the extra signal line and a system thereof are indeed highly anticipated by the public and become the goal and the direction of relevant industry efforts.

SUMMARY

According to one aspect of the present disclosure, a carriers synchronizing method of a hybrid frequency parallel inverter is configured to synchronize a high-frequency carrier to a low-frequency carrier. The carriers synchronizing method of the hybrid frequency parallel inverter includes an inverter paralleling step, a low-frequency ripple simulating step, an equidistant grid sampling step, an actual shifting angle searching step and a high-frequency carrier adjusting step. The inverter paralleling step is performed to connect a low-frequency high power inverter and a high-frequency low power inverter in parallel. The low-frequency high power inverter is controlled by the low-frequency carrier, and the high-frequency low power inverter is controlled by the high-frequency carrier. The low-frequency ripple simulating step is performed to drive a high-frequency controlling unit to simulate a low-frequency ripple corresponding to the low-frequency high power inverter according to a simulating procedure. The high-frequency controlling unit includes a proportional integral controller and a period counter, and the period counter is configured to generate the high-frequency carrier. The equidistant grid sampling step is performed to drive the high-frequency controlling unit to sample a sample ripple according to an equidistant grid to generate a sample group, and sample the low-frequency ripple according to the equidistant grid and a plurality of reference shifting angles to generate a plurality of low-frequency reference groups. The low-frequency reference groups correspond to the reference shifting angles, respectively. The actual shifting angle searching step is performed to drive the high-frequency controlling unit to compare the sample group with the low-frequency reference groups to search an actual shifting angle between the high-frequency carrier and the low-frequency carrier from the reference shifting angles. The high-frequency carrier adjusting step is performed to drive the proportional integral controller to calculate the actual shifting angle according to an adjusting procedure to generate a sync reference, and then drive the period counter to adjust a starting point of the high-frequency carrier according to the sync reference.

According to another aspect of the present disclosure, a carriers synchronizing system of a hybrid frequency parallel inverter is configured to synchronize a high-frequency carrier to a low-frequency carrier. The carriers synchronizing system of the hybrid frequency parallel inverter includes a low-frequency high power inverter, a low-frequency controlling unit, a high-frequency low power inverter and a high-frequency controlling unit. The low-frequency controlling unit is electrically connected to and controls the low-frequency high power inverter. The low-frequency controlling unit is configured to generate the low-frequency carrier. The high-frequency low power inverter is connected to the low-frequency high power inverter in parallel. The high-frequency controlling unit is electrically connected to and controls the high-frequency low power inverter. The high-frequency controlling unit includes a proportional integral controller and a period counter, and stores a sample ripple. The period counter is configured to generate the high-frequency carrier. The high-frequency controlling unit is configured to implement a carriers synchronizing method of a hybrid frequency parallel inverter including performing a low-frequency ripple simulating step, an equidistant grid sampling step, an actual shifting angle searching step and a high-frequency carrier adjusting step. The low-frequency ripple simulating step is performed to simulate a low-frequency ripple corresponding to the low-frequency high power inverter according to a simulating procedure. The equidistant grid sampling step is performed to sample the sample ripple according to an equidistant grid to generate a sample group, and sample the low-frequency ripple according to the equidistant grid and a plurality of reference shifting angles to generate a plurality of low-frequency reference groups. The low-frequency reference groups correspond to the reference shifting angles, respectively. The actual shifting angle searching step is performed to compare the sample group with the low-frequency reference groups to search an actual shifting angle between the high-frequency carrier and the low-frequency carrier from the reference shifting angles. The high-frequency carrier adjusting step is performed to drive the proportional integral controller to calculate the actual shifting angle according to an adjusting procedure to generate a sync reference, and then drive the period counter to adjust a starting point of the high-frequency carrier according to the sync reference.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
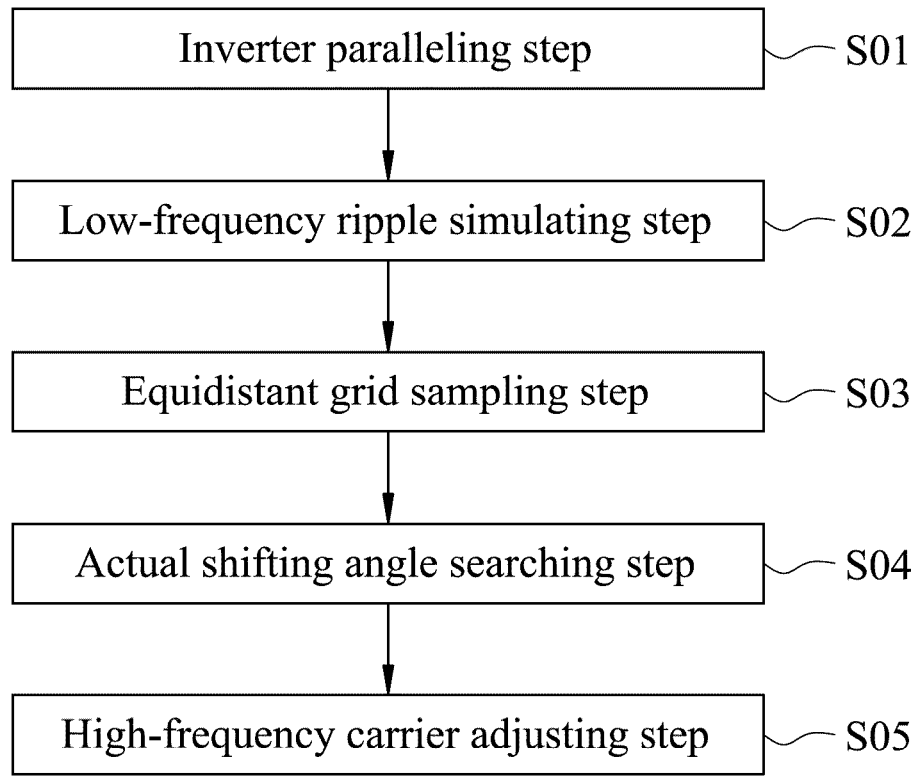
FIG. 1 shows a flow chart of a carriers synchronizing method of a hybrid frequency parallel inverter according to a first embodiment of the present disclosure.

Please refer to FIG. 1. FIG. 1 shows a flow chart of a carriers synchronizing method 100 of a hybrid frequency parallel inverter according to a first embodiment of the present disclosure. As shown in FIG. 1, the carriers synchronizing method 100 of the hybrid frequency parallel inverter is configured to synchronize a high-frequency carrier to a low-frequency carrier, and includes an inverter paralleling step S01, a low-frequency ripple simulating step S02, an equidistant grid sampling step S03, an actual shifting angle searching step S04 and a high-frequency carrier adjusting step S05.

The inverter paralleling step S01 is performed to connect a Low-Frequency High Power Inverter (LFHPI) and a High-Frequency Low Power Inverter (HFLPI) in parallel. The low-frequency high power inverter is controlled by the low-frequency carrier, and the high-frequency low power inverter is controlled by the high-frequency carrier.

The low-frequency ripple simulating step S02 is performed to drive a high-frequency controlling unit to simulate a low-frequency ripple corresponding to the low-frequency high power inverter according to a simulating procedure. The high-frequency controlling unit includes a proportional integral controller for carriers shift control and a period counter, and the period counter is configured to generate the high-frequency carrier.

The equidistant grid sampling step S03 is performed to drive the high-frequency controlling unit to sample a sample ripple according to an equidistant grid to generate a sample group, and sample the low-frequency ripple modeled command according to the equidistant grid and a plurality of reference shifting angles to generate a plurality of low-frequency reference groups. The low-frequency reference groups correspond to the reference shifting angles, respectively.

The actual shifting angle searching step S04 is performed to drive the high-frequency controlling unit to compare the sample group with the low-frequency reference groups to search an actual shifting angle between the high-frequency carrier and the low-frequency carrier from the reference shifting angles.

The high-frequency carrier adjusting step S05 is performed to drive the proportional integral controller to calculate the actual shifting angle according to an adjusting procedure to generate a sync reference, and then drive the period counter to adjust a starting point of the high-frequency carrier according to the sync reference.

Therefore, the carriers synchronizing method 100 of the hybrid frequency parallel inverter of the present disclosure obtains the actual shifting angle between the high-frequency carrier and the low-frequency carrier through the low-frequency ripple having been simulated, and uses the actual shifting angle to synchronize the high-frequency carrier to the low-frequency carrier so as to achieve the state when the ripple current of the low-frequency high power inverter can be attenuated by the high-frequency low power inverter. As a result, high dynamic response is achieved without using high-frequency communication line to synchronize the high-frequency carrier, thereby increasing the freedom of the circuit configuration.

Figure 2:
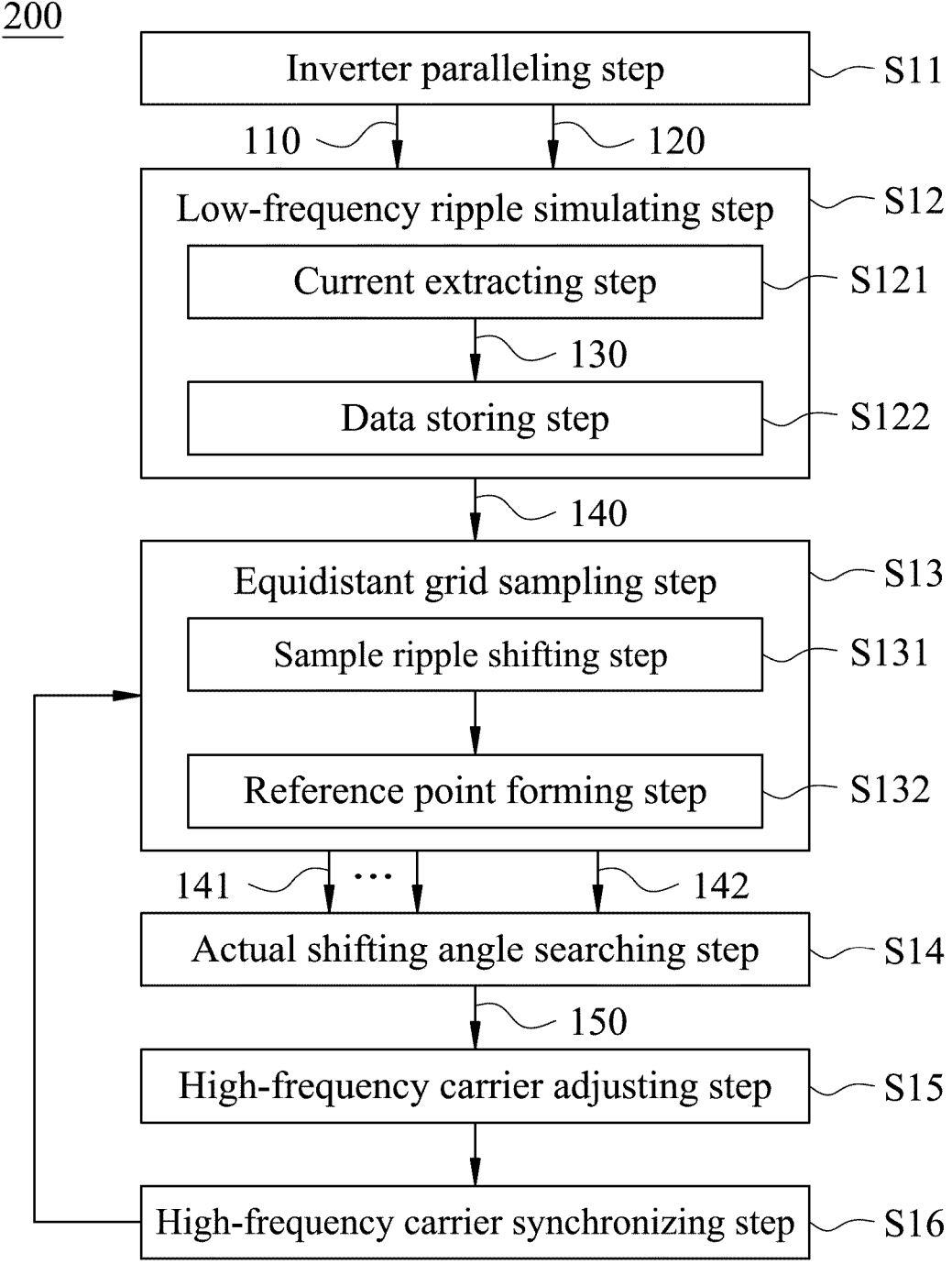
FIG. 2 shows a flow chart of a carriers synchronizing method of a hybrid frequency parallel inverter according to a second embodiment of the present disclosure.

Please refer to FIG. 2. FIG. 2 shows a flow chart of a carriers synchronizing method 200 of a hybrid frequency parallel inverter according to a second embodiment of the present disclosure. As shown in FIG. 2, the carriers synchronizing method 200 of the hybrid frequency parallel inverter includes an inverter paralleling step S11, a low-frequency ripple simulating step S12, an equidistant grid sampling step S13, an actual shifting angle searching step S14 and a high-frequency carrier adjusting step S15. The inverter paralleling step S11, the actual shifting angle searching step S14 and the high-frequency carrier adjusting step S15 are all the same as the steps corresponding to the carriers synchronizing method 100 of the parallel inverter, and will not be described again herein.

Especially, the carriers synchronizing method 200 of the hybrid frequency parallel inverter can further include a high-frequency carrier synchronizing step S16. The high-frequency carrier synchronizing step S16 is performed to drive the high-frequency controlling unit to re-execute the equidistant grid sampling step S13, the actual shifting angle searching step S14 and the high-frequency carrier adjusting step S15 according to the high-frequency carrier 120 having been adjusted until the starting point of the high-frequency carrier 120 at an instant cycle is equal to the starting point of the high-frequency carrier 120 at a next cycle, so that the high-frequency carrier 120 is gradually synchronized to the low-frequency carrier 110.

In the carriers synchronizing method 200 of the parallel inverter, the low-frequency high power inverter is connected to the high-frequency low power inverter in parallel to form the parallel converter, and the simulating procedure and the adjusting procedure can be executed by the high-frequency controlling unit. The carriers synchronizing method 200 of the hybrid frequency parallel inverter of the present disclosure is described in more detail with the drawings and the embodiments below.

Figure 5:
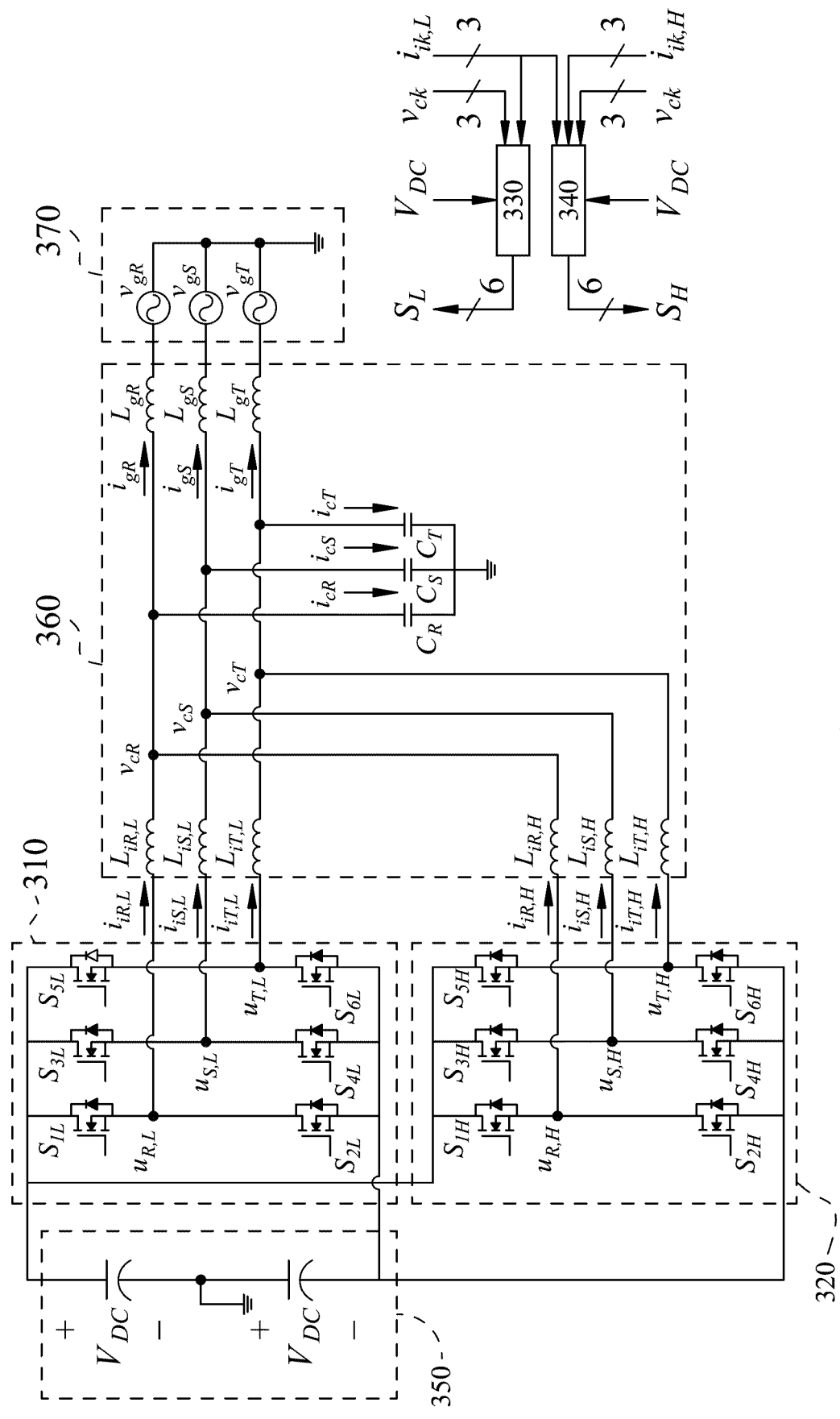
FIG. 5 shows a schematic circuit diagram of the carriers synchronizing system of the hybrid frequency parallel inverter of FIG. 3.

The following Table 1 lists a plurality of circuit symbols corresponding to FIG. 5 of the present disclosure to facilitate the understanding of the present disclosure.

TABLE 1

| Symbol | Definition |
| --- | --- |
| $V_{DC}$ | a DC voltage |
| $S_{1L}$ - $S_{6L}$ | a low-frequency switching element |
| $S_L$ | any one of the low-frequency switching elements $S_{1L}$, $S_{2L}$, $S_{3L}$, $S_{4L}$, $S_{5L}$, $S_{6L}$ |
| $u_{R,L}$ | a R phase output of the low-frequency high power inverter |
| $u_{S,L}$ | a S phase output of the low-frequency high power inverter |
| $u_{T,L}$ | a T phase output of the low-frequency high power inverter |
| $i_{iR,L}$ | a R phase inductance current output by the R phase output $u_{R,L}$ |
| $i_{iS,L}$ | a S phase inductance current output by the S phase output $u_{S,L}$ |
| $i_{iT,L}$ | a T phase inductance current output by the T phase output $u_{T,L}$ |
| $i_{ik,L}$ | any one of the phase inductance currents $i_{iR,L}$, $i_{iS,L}$, $i_{iT,L}$ |
| $S_{1H}$ - $S_{6H}$ | a high-frequency switching element |
| $S_H$ | any one of the high-frequency switching elements $S_{1H}$, $S_{2H}$, $S_{3H}$, $S_{4H}$, $S_{5H}$, $S_{6H}$ |
| $u_{R,H}$ | a R-phase output of the high-frequency low power inverter |
| $u_{S,H}$ | a S-phase output of the high-frequency low power inverter |
| $u_{T,H}$ | a T-phase output of the high-frequency low power inverter |
| $i_{iR,H}$ | a R phase inductance current output by the R phase output $u_{R,H}$ |
| $i_{iS,H}$ | a S phase inductance current output by the S phase output $u_{S,H}$ |
| $i_{iT,H}$ | a T phase inductance current output by the T phase output $u_{T,H}$ |
| $i_{ik,H}$ | any one of the phase inductance currents $i_{iR,H}$, $i_{iS,H}$, $i_{iT,H}$ |
| $L_{iR,L}$ | a R phase low-frequency inductance |
| $L_{iS,L}$ | a S phase low-frequency inductance |
| $L_{iT,L}$ | a T phase low-frequency inductance |
| $L_{iR,H}$ | a R phase high-frequency inductance |
| $L_{iS,H}$ | a S phase high-frequency inductance |
| $L_{iT,H}$ | a T phase high-frequency inductance |
| $C_R$ | a R phase capacitance |
| $C_S$ | a S phase capacitance |
| $C_T$ | a T phase capacitance |
| $v_{cR}$ | an output voltage between two sides of the R phase capacitance of a filter |
| $v_{cS}$ | an output voltage between two sides of the S phase capacitance of a filter |
| $v_{cT}$ | an output voltage between two sides of the T phase capacitance of a filter |
| $v_{ck}$ | any one of the output voltages $v_{cR}$, $v_{cS}$, $v_{cT}$ |
| $i_{cR}$ | a R phase capacitance current |
| $i_{cS}$ | a S phase capacitance current |
| $i_{cT}$ | a T phase capacitance current |
| $i_{gR}$ | a R phase load current |
| $i_{gS}$ | a S phase load current |
| $i_{gT}$ | a T phase load current |
| $L_{gR}$ | a R phase inductance at an AC end |
| $L_{gS}$ | a S phase inductance at the AC end |
| $L_{gT}$ | a T phase inductance at the AC end |
| $v_{gR}$ | a R voltage at the AC end |
| $v_{gS}$ | a S voltage at the AC end |
| $v_{gT}$ | a T voltage at the AC end |

Figure 3:
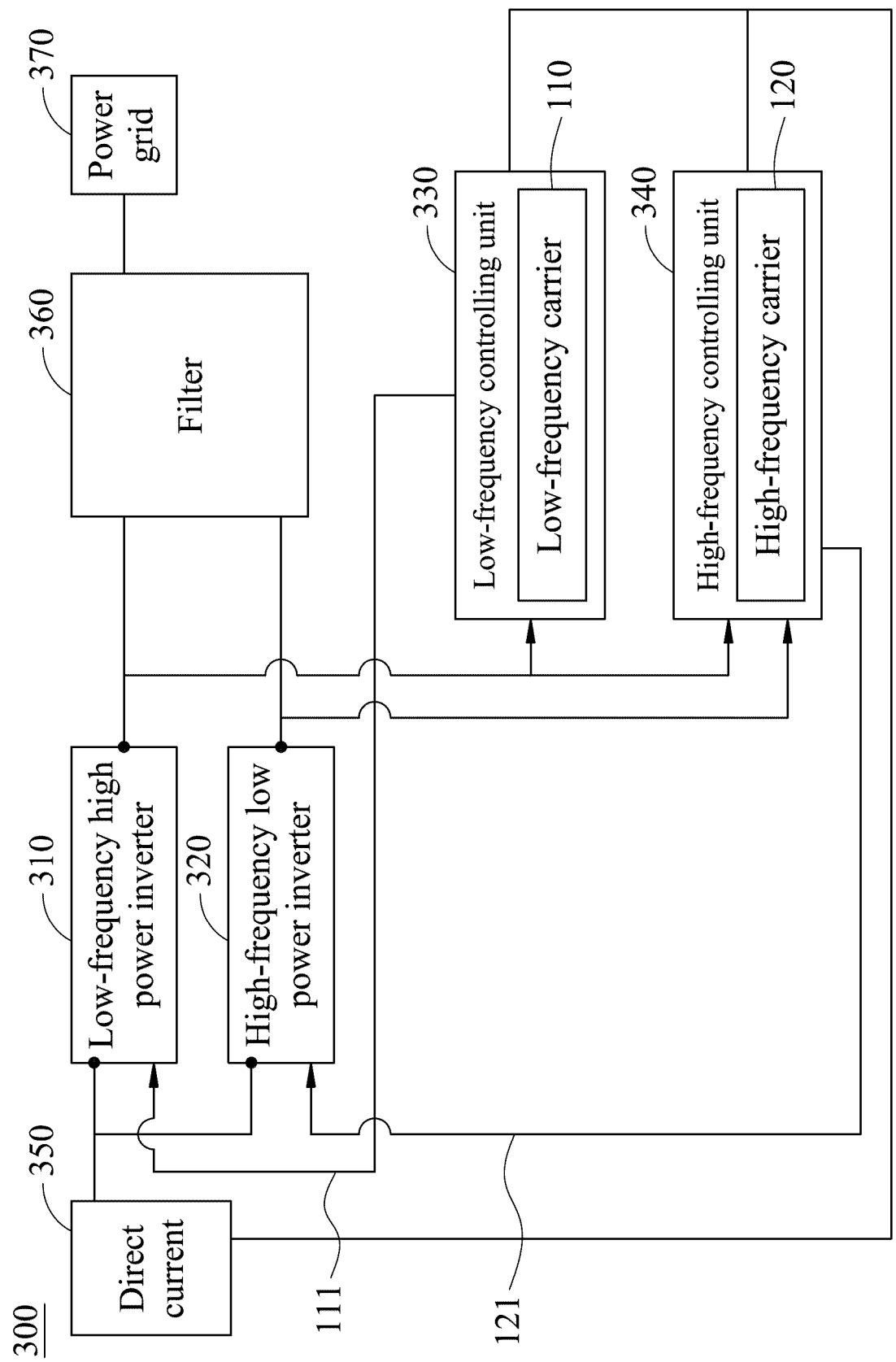
FIG. 3 shows a block diagram of a carriers synchronizing system of a hybrid frequency parallel inverter according to a third embodiment of the present disclosure.
Figure 4:
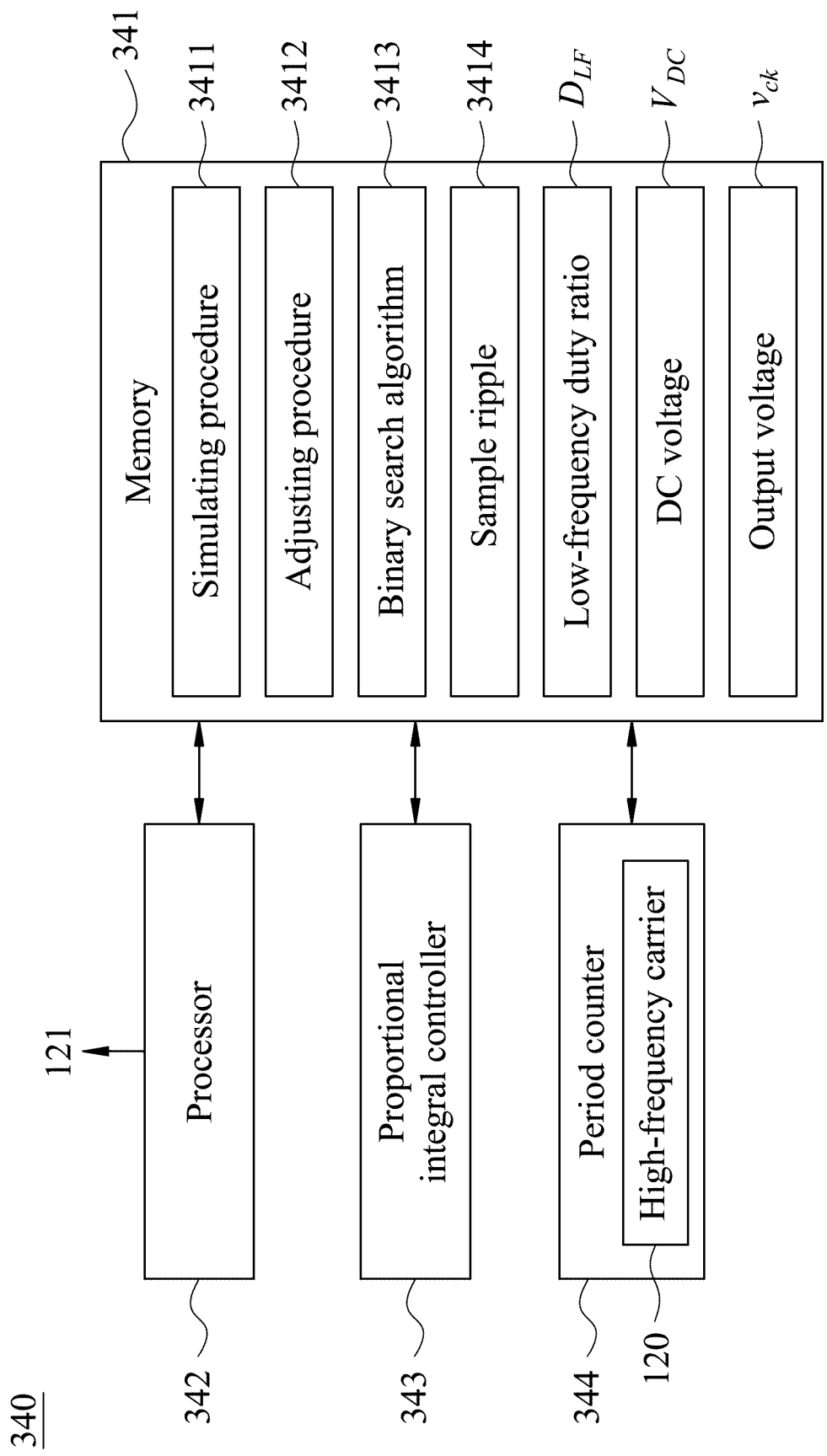
FIG. 4 shows a block diagram of a high-frequency controlling unit of FIG. 3.

Please refer to FIGS. 3, 4 and 5. FIG. 3 shows a block diagram of a carriers synchronizing system 300 of a hybrid frequency parallel inverter according to a third embodiment of the present disclosure. FIG. 4 shows a block diagram of a high-frequency controlling unit 340 of FIG. 3. FIG. 5 shows a schematic circuit diagram of the carriers synchronizing system 300 of the hybrid frequency parallel inverter of FIG. 3. It should be noted that the carriers synchronizing system 300 of the hybrid frequency parallel inverter of the third embodiment is configured to implement the carriers synchronizing methods 100, 200 of the parallel inverter, and can synchronize a high-frequency carrier 120 to a low-frequency carrier 110.

As shown in FIGS. 3 to 5, the carriers synchronizing system 300 of the hybrid frequency parallel inverter includes a low-frequency high power inverter 310, a high-frequency low power inverter 320, a low-frequency controlling unit 330, a high-frequency controlling unit 340, a direct current 350, a filter 360 and a power grid 370. The direct current 350 is electrically connected to the low-frequency high power inverter 310, the high-frequency low power inverter 320, the low-frequency controlling unit 330 and the high-frequency controlling unit 340, and provides power. The high-frequency low power inverter 320 is connected to the low-frequency high power inverter 310 in parallel to form the parallel converter applied to an Uninterruptible Power System (UPS).

The low-frequency controlling unit 330 is electrically connected to the low-frequency high power inverter 310 and configured to generate the low-frequency carrier 110, and then convert the low-frequency carrier 110 to output a first Pulse-Width Modulation (PWM) signal 111, so that a duty ratio of the low-frequency high power inverter 310 is controlled through the first PWM signal 111.

The high-frequency controlling unit 340 is electrically connected to the high-frequency low power inverter 320 and can include a memory 341, a processor 342, a proportional integral controller 343 and a period counter 344. The memory 341 is configured to store a simulating procedure 3411, an adjusting procedure 3412, a binary search algorithm 3413, a sample ripple 3414 of the low-frequency high power inverter 310, a low-frequency duty ratio $D_{LF}$, a DC voltage $V_{DC}$ and an output voltage $v_{ck}$ (that is, any one of the output voltages $v_{cR}$, $v_{cS}$, $v_{cT}$ in Table 1) corresponding to the low-frequency high power inverter 310. The processor 342 is electrically connected to the memory 341 and configured to execute the simulating procedure 3411. The processor 342 can be a Digital Signal Processor (DSP), a Micro Processing Unit (MPU), a Central Processing Unit (CPU) or other electronic processors, but the present disclosure is not limited thereto.

The proportional integral controller 343 and the period counter 344 are electrically connected to the memory 341. The proportional integral controller 343 is configured to execute the adjusting procedure 3412. The period counter 344 is configured to generate the high-frequency carrier 120 and transmits the high-frequency carrier 120 to the memory 341. The processor 342 converts the high-frequency carrier 120 to output a second Pulse-Width Modulation (PWM) signal 121 so as to control a duty ratio of the high-frequency low power inverter 320. Further, in the third embodiment, the low-frequency high power inverter 310 and the high-frequency low power inverter 320 can be a full-bridge inverters, but the present disclosure is not limited thereto. In other embodiments, the low-frequency high power inverter and the high-frequency low power inverter can also be half-bridge inverters or other types of inverters.

The filter 360 is electrically connected to the low-frequency high power inverter 310, the high-frequency low power inverter 320, the low-frequency controlling unit 330 and the high-frequency controlling unit 340, and can be a LCL filter. The power grid 370 is electrically connected to the filter 360. In detail, a DC end of the low-frequency high power inverter 310 and a DC end of the high-frequency low power inverter 320 are connected to each other in parallel to receive the direct current 350 together. An output end of the filter 360 is connected to the power grid 370 in parallel, so that the direct current 350 can be converted into a three-phase AC power through the filter 360, and the three-phase AC power is provided to the power grid 370 on the back end, or another three-phase AC power received from the power grid 370 can be reversely converted through the filter 360 (i.e., AC to DC).

The algorithm of the carriers synchronizing method 200 of the hybrid frequency parallel inverter of the present disclosure is described continuously below. Please refer to FIGS. 2 to 5.

In the second embodiment, the low-frequency ripple simulating step S12 is similar to the low-frequency ripple simulating step S02 of the first embodiment. The difference from the first embodiment is that the low-frequency ripple simulating step S12 can include performing a current extracting step S121 and a data storing step S122. The current extracting step S121 is performed to drive the high-frequency controlling unit 340 to extract an inductance current 130 from a low-frequency inductance connected to the low-frequency high power inverter 310 through a current sensor (not shown). In detail, the current sensor can be a Hall sensor, which extracts the R phase inductance current $i_{iR,L}$, the S phase inductance current $i_{iS,L}$ or the T phase inductance current $i_{iT,L}$ from one of the R phase low-frequency inductance $L_{iR,L}$, the S phase low-frequency inductance $L_{iS,L}$ and the T phase low-frequency inductance $L_{iT,L}$ in FIG. 5 as the inductance current 130.

The data storing step S122 is performed to drive the memory 341 of the high-frequency controlling unit 340 to store a low-frequency duty ratio $D_{LF}$, a DC voltage $V_{DC}$ and an output voltage $v_{ck}$ corresponding to the low-frequency high power inverter 310. The processor 342 of the high-frequency controlling unit 340 calculates the inductance current 130, the low-frequency duty ratio $D_{LF}$, the DC voltage $V_{DC}$ and the output voltage $v_{ck}$ according to the simulating procedure 3411 to simulate the low-frequency carrier 110 used to control the low-frequency high power inverter 310 and generate a low-frequency ripple 140.

Figure 6:
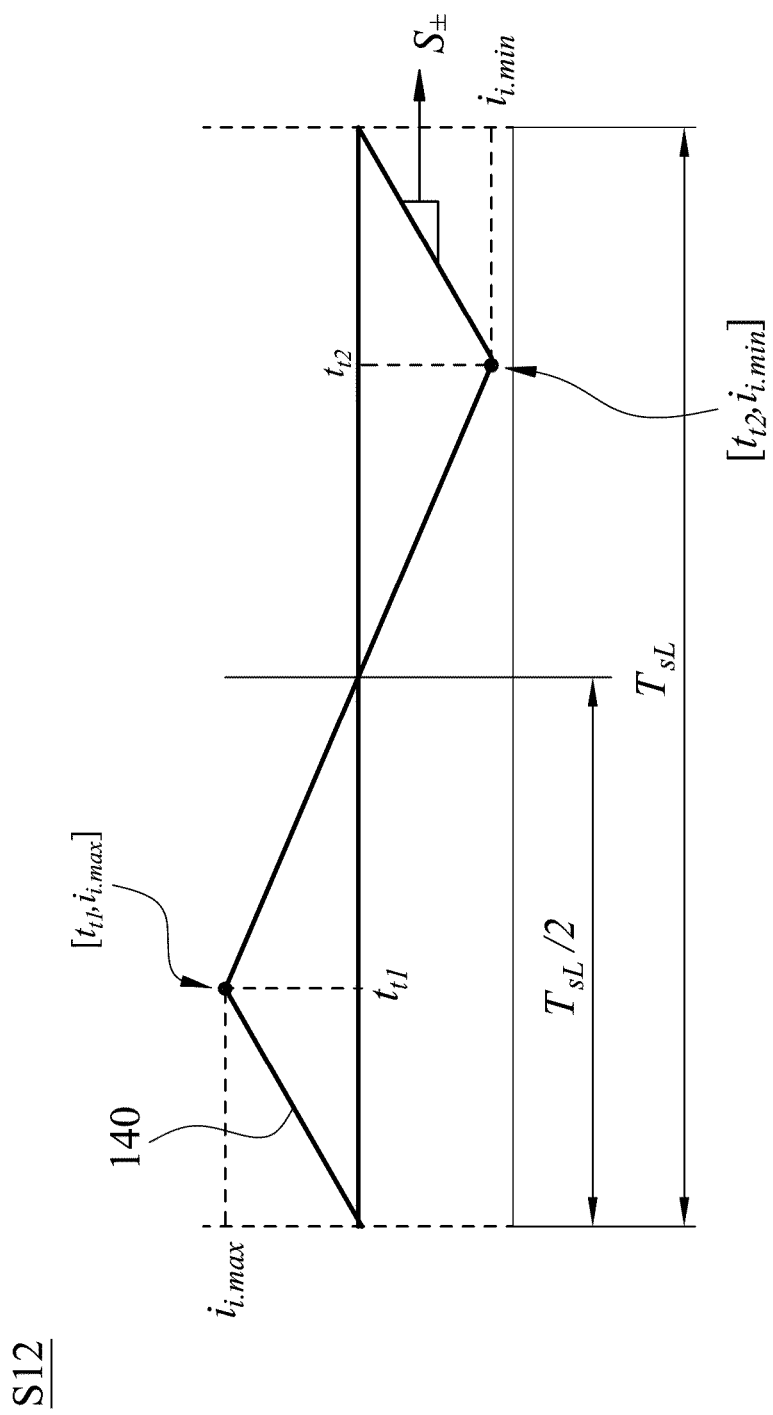
FIG. 6 shows a schematic view of a low-frequency ripple simulating step of the carriers synchronizing method of the hybrid frequency parallel inverter of FIG. 2.

Please refer to FIGS. 2 to 5 and FIG. 6. FIG. 6 shows a schematic view of the low-frequency ripple simulating step S12 of the carriers synchronizing method 200 of the hybrid frequency parallel inverter of FIG. 2. In the low-frequency ripple simulating step S12, the simulating procedure 3411 can include a first turning point, a second turning point and a slope. The first turning point is represented as $[t_{t1}, i_{i,max}]$, the second turning point is represented as $[t_{t2}, i_{i,min}]$, and the slope is represented as $S_\pm$ and conforms to the following equations (1), (2) and (3):

$$\begin{cases} t_{t1} = \dfrac{T_{sL} D_{LF}[n+1]}{2} \\ i_{i,\max} = t_t * S \end{cases} \quad (1)$$

$$\begin{cases} t_{t2} = T_{sL} - t_{t1} \\ i_{i,\min} = -i_{i,\max} \end{cases} \quad (2)$$

$$S_\pm = \dfrac{(\pm V_{DC}[n] - v_{ck}[n])}{L_{iL}} - \dfrac{\Delta i_i[n]}{T_{sL}} \quad (3)$$

$t_{t1}$ is a first moment of the slope turning, $t_{t2}$ is a second moment of the slope turning, $i_{i,max}$ is a maximum current value of the low-frequency ripple 140, $i_{i,min}$ is a minimum current value of the low-frequency ripple 140, S is a positive value of the slope, $T_{sL}$ is a low-frequency ripple period, $D_{LF}$ is the low-frequency duty ratio, n is a given period, $V_{DC}$ is the DC voltage, $V_{ck}$ is the output voltage, $\Delta i_i$ is an inductance current difference, and $L_{iL}$ is an inductance value. In detail, the high-frequency controlling unit 340 predicts the low-frequency carrier 110 through the low-frequency ripple 140 simulated from the simulating procedure 3411. The low-frequency ripple 140 can be represented by the first turning point $[t_{t1}, i_{i,max}]$, the second turning point $[t_{t2}, i_{i,min}]$ and the slope $S_\pm$. The first turning point $[t_{t1}, i_{i,max}]$ from the positive slope to the negative slope can be calculated through the low-frequency duty ratio $D_{LF}$, and the first turning point $[t_{t1}, i_{i,max}]$ can be used to derive the second turning point $[t_{t2}, i_{i,min}]$.

Figure 7:
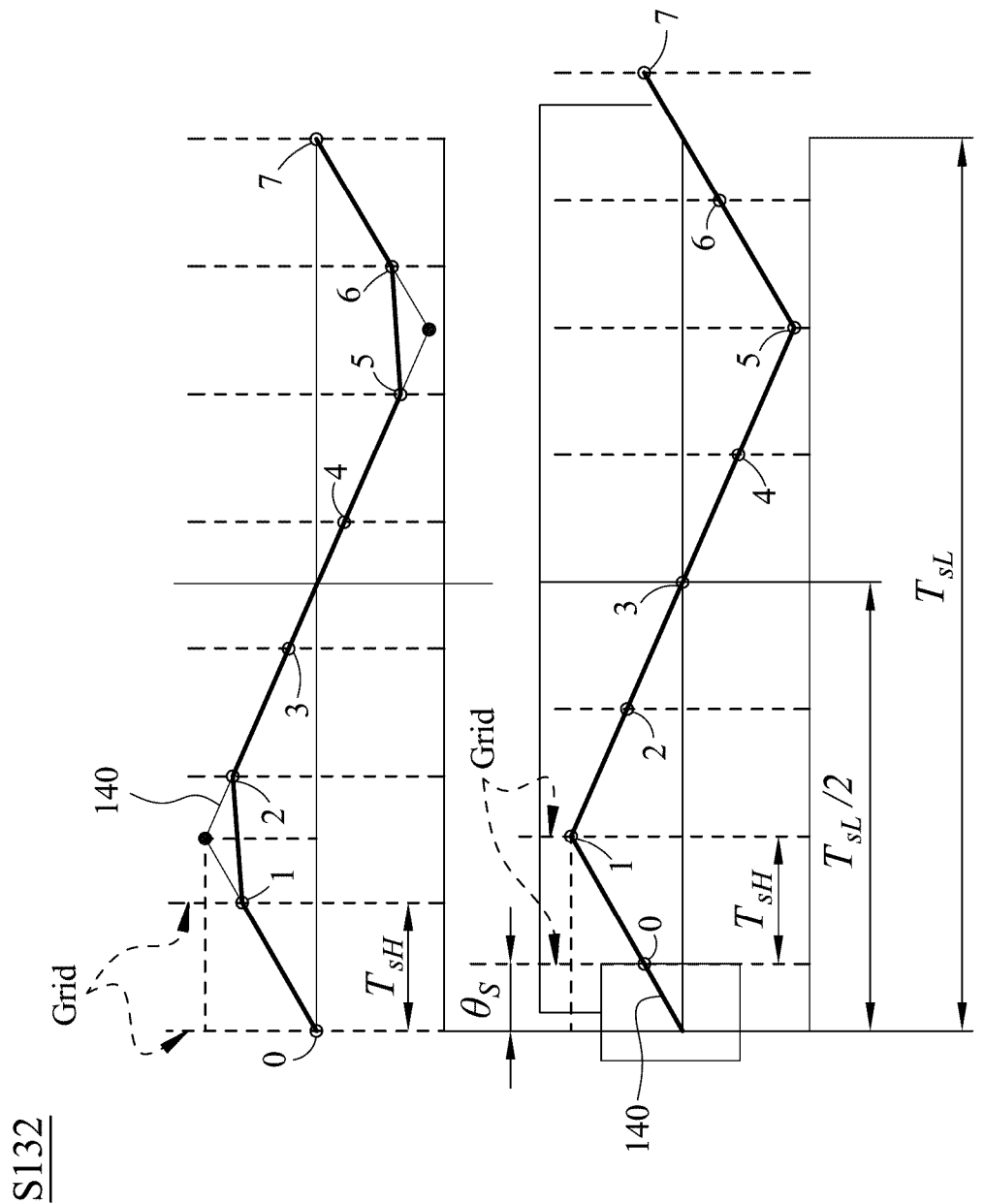
FIG. 7 shows a schematic view of a reference point forming step of the carriers synchronizing method of the hybrid frequency parallel inverter of FIG. 2.

Please refer to FIGS. 2 to 6 and FIG. 7. FIG. 7 shows a schematic view of a reference point forming step S132 of the carriers synchronizing method 200 of the hybrid frequency parallel inverter of FIG. 2. In the second embodiment, the equidistant grid sampling step S13 is similar to the equidistant grid sampling step S03 of the first embodiment. The difference from the first embodiment is that the equidistant grid sampling step S13 can include performing a sample ripple shifting step S131 and the reference point forming step S132. The sample ripple shifting step S131 is performed to drive the processor 342 of the high-frequency controlling unit 340 to shift eight sample points of the sample ripple 3414 according to the equidistant grid Grid. The eight sample points are a sample group 142.

The reference point forming step S132 is performed to drive the processor 342 of the high-frequency controlling unit 340 to form a plurality of reference points corresponding to each of the reference shifting angles from the low-frequency ripple 140 according to the equidistant grid Grid. The reference points corresponding to each of the reference shifting angles are each of the low-frequency reference groups 141. It should be noted that FIG. 7 only shows the reference points 0, 1, 2, 3, 4, 5, 6, 7 corresponding to one of the reference shifting angles $\theta_s$, and the reference shifting angle $\theta_s$ can be 0-360 degrees.

As shown in FIG. 7, a length of the equidistant grid Grid can be a time length of a high-frequency carrier period $T_{sH}$. After the processor 342 shifts the equidistant grid Grid by the reference shifting angle $\theta_s$, the processor 342 forms eight reference points 0, 1, 2, 3, 4, 5, 6, 7 from the low-frequency ripple 140 according to the equidistant grid Grid having been shifted. The eight reference points 0, 1, 2, 3, 4, 5, 6, 7 are one of the low-frequency reference groups 141. Similarly, the processor 342 can shift the equidistant grid Grid by another reference shifting angle $\theta_s$, and then forms another eight reference points from the low-frequency ripple 140 according to the equidistant grid Grid having been shifted. The another eight reference points are used as another low-frequency reference group 141, and so on to generate the plurality of low-frequency reference groups 141. In addition, the processor 342 temporarily stores the sample group 142 having been sampled and the low-frequency reference groups 141 in a First-In-First-Out Buffer (FIFO Buffer) inside the processor 342.

In the actual shifting angle searching step S14, the sample points of the sample group 142 correspond to a sample vector. The reference points 0, 1, 2, 3, 4, 5, 6, 7 of the low-frequency reference groups 141 also correspond to a reference vector. The processor 342 of the high-frequency controlling unit 340 performs an inner-product operation on the sample vector containing the sample points of the low-frequency high power inverter 310 and a plurality of the reference vectors of the low-frequency reference groups 141 shifted in the space of 0 to 360 degrees according to the binary search algorithm 3413 to find and select one of the reference shifting angles $\theta_s$ resulting to a largest inner-product as an actual shifting angle 150.

In detail, the binary search algorithm 3413 is mainly configured to search for a shifting angle between the high-frequency carrier 120 and the low-frequency ripple 140. For this reason, the present disclosure regards the eight sample points as the sample vector, and regards the eight reference points 0, 1, 2, 3, 4, 5, 6, 7 as the reference vector. It is well known that an inner-product of orthogonal vectors equals zero, and collinear or parallel vectors of the same length will produce a maximum of inner-product. In the second embodiment, the processor 342 performs an one-to-one inner-product operation on the sample vector with the reference vectors of the low-frequency reference groups 141 corresponding to the different reference shifting angles $\theta_s$. Therefore, the reference offset angle $\theta_s$ corresponding to the one with the largest inner-product represents that the reference offset angle $\theta_s$ is actually the shifting angle between the high-frequency carrier 120 and the low-frequency ripple 140, and the shifting angle represents that the high-frequency carrier 120 and the low-frequency carrier 110 are shifted by the actual shifting angle 150.

Figure 8:
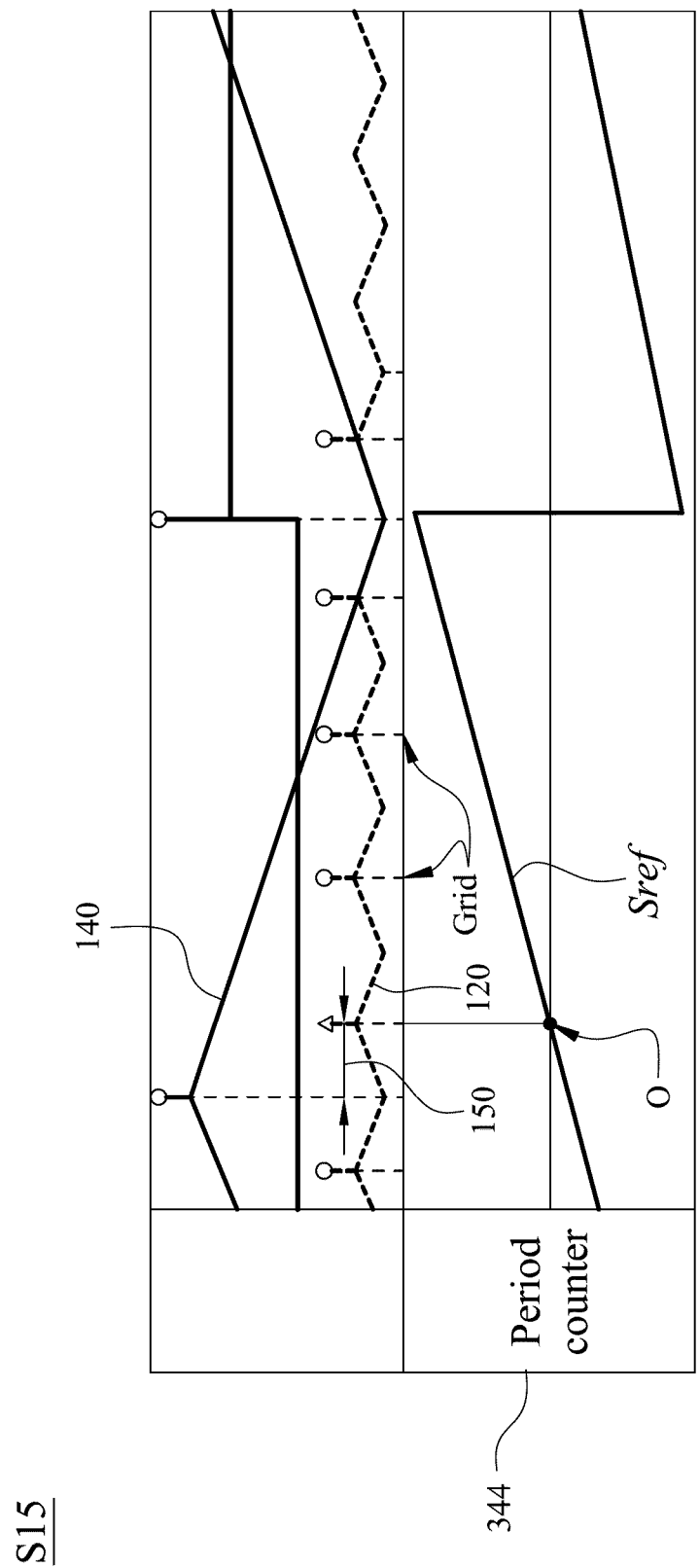
FIG. 8 shows a schematic view of a high-frequency carrier adjusting step of the carriers synchronizing method of the hybrid frequency parallel inverter of FIG. 2.

Please refer to FIGS. 2 to 7 and FIG. 8. FIG. 8 shows a schematic view of the high-frequency carrier adjusting step S15 of the carriers synchronizing method 200 of the hybrid frequency parallel inverter of FIG. 2. In the high-frequency carrier adjusting step S15, the adjusting procedure 3412 can include a sync reference, the actual shifting angle 150 and an integral gain. The sync reference is represented as Sref, the actual shifting angle 150 is represented as θ, and the integral gain is represented as $K_i$ and conforms to the following equation (4):

$$Sref[n] = Sref[n-1] + K_i(180° - 2\theta) \quad (4)$$

n is a given period. In detail, the actual shifting angle 150 is configured to find the difference between a synchronization target and the intersection of the period counter 344 and the sync reference Sref. For this reason, the proportional integral controller 343 executes the adjusting procedure 3412 to correct the sync reference Sref. First, the proportional integral controller 343 calculates the sync reference Sref at an instant cycle by substituting the actual shifting angle 150 into the equation (4). Second, the period counter 344 adjusts a starting point O of the high-frequency carrier 120 according to the sync reference Sref at the instant cycle, so that the high-frequency carrier 120 is gradually synchronized to the low-frequency ripple 140 used to predict the low-frequency carrier 110.

Figure 9:
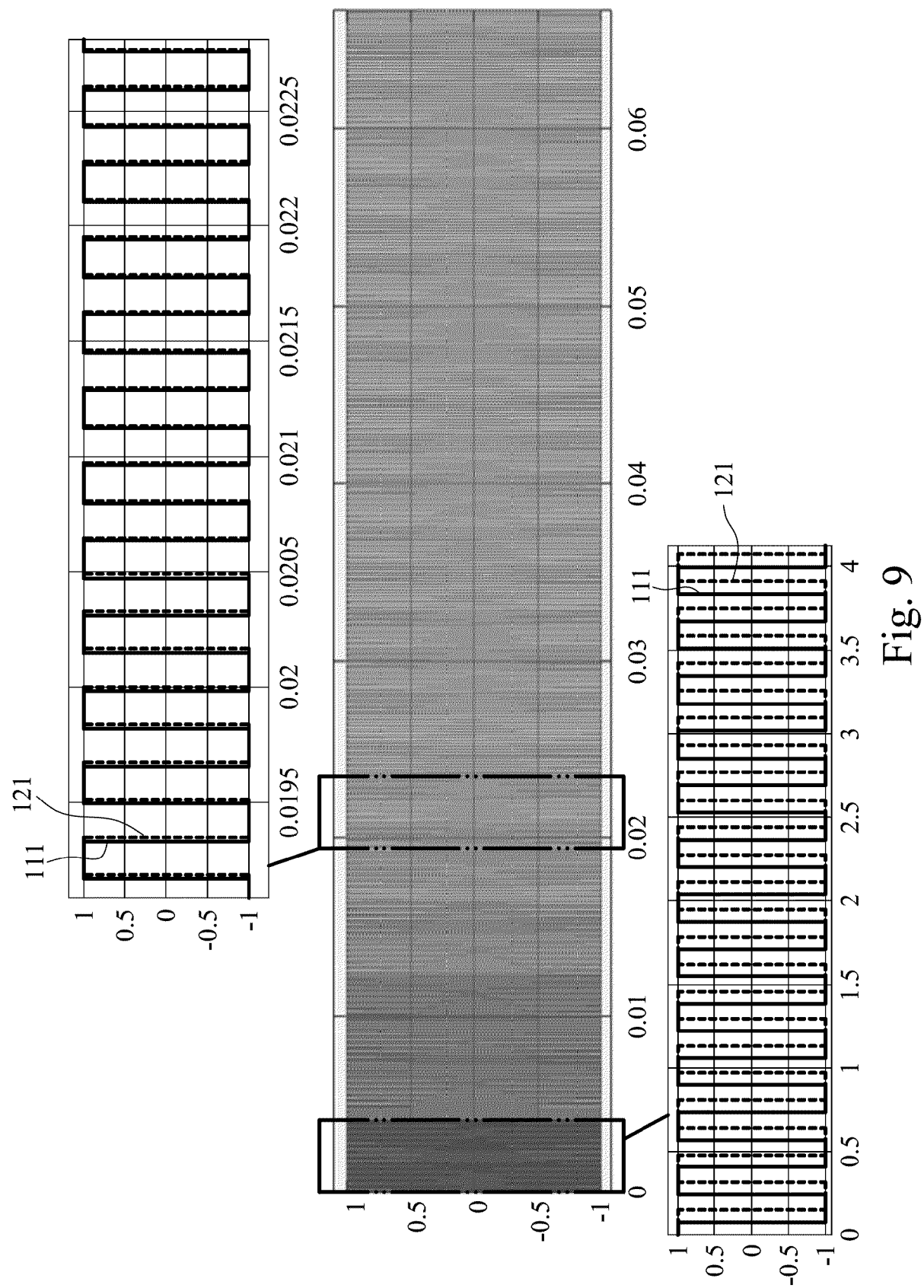
FIG. 9 shows a schematic view of a first pulse-width modulation signal corresponding to a low-frequency carrier and a second pulse-width modulation signal corresponding to a high-frequency carrier having been adjusted.

Please refer to FIGS. 2 to 8 and FIG. 9. FIG. 9 shows a schematic view of the first pulse-width modulation signal 111 corresponding to the low-frequency carrier 110 and the second pulse-width modulation signal 121 corresponding to the high-frequency carrier 120 having been adjusted. In the high-frequency carrier synchronizing step S16, the high-frequency controlling unit 340 re-executes the equidistant grid sampling step S13, the actual shifting angle searching step S14 and the high-frequency carrier adjusting step S15 according to the high-frequency carrier 120 having been adjusted after adjusting the starting point O until the starting point O of the high-frequency carrier 120 at the instant cycle is equal to the starting point O of the high-frequency carrier 120 at the next cycle. Therefore, the high-frequency carrier 120 is gradually synchronized to the low-frequency carrier 110; in other words, the second pulse-width modulation signal 121 is also gradually synchronized to the first pulse-width modulation signal 111 (as shown in FIG. 9), and the error between the first pulse-width modulation signal 111 and the second pulse-width modulation signal 121 can be -0.12%. In addition, due to the imperfection of the oscillator, the switching period of the low-frequency high power inverter 310 is floating, so the proportional integral controller 343 can execute the adjusting procedure 3412 once every N cycles of the low-frequency high power inverter 310. In the second embodiment, N can be 25, but the present disclosure is not limited thereto.

In summary, the present disclosure has the following advantages. First, the low-frequency ripple having been simulated can be used to find the actual shifting angle between the low-frequency carrier and the high-frequency carrier so as to gradually adjust the high-frequency carrier to synchronize to the low-frequency carrier. Second, it is favorable to achieve high dynamic response and avoid using high-frequency communication channel to synchronize the high-frequency carrier, thereby increasing the freedom of the circuit configuration. Third, there is no need to use the extra signal line to synchronize the high-frequency carrier, so that the noise interference between the low-frequency controlling unit and the high-frequency controlling unit is reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A carriers synchronizing method of a hybrid frequency parallel inverter, which is configured to synchronize a high-frequency carrier to a low-frequency carrier, the carriers synchronizing method of the hybrid frequency parallel inverter comprising:

performing an inverter paralleling step to connect a low-frequency high power inverter and a high-frequency low power inverter in parallel, wherein the low-frequency high power inverter is controlled by the low-frequency carrier, and the high-frequency low power inverter is controlled by the high-frequency carrier;

performing a low-frequency ripple simulating step to drive a high-frequency controlling unit to simulate a low-frequency ripple corresponding to the low-frequency high power inverter according to a simulating procedure, wherein the high-frequency controlling unit comprises a proportional integral controller and a period counter, and the period counter is configured to generate the high-frequency carrier;

performing an equidistant grid sampling step to drive the high-frequency controlling unit to sample a sample ripple according to an equidistant grid to generate a sample group and sample the low-frequency ripple according to the equidistant grid and a plurality of reference shifting angles to generate a plurality of low-frequency reference groups, wherein the low-frequency reference groups correspond to the reference shifting angles, respectively;

performing an actual shifting angle searching step to drive the high-frequency controlling unit to compare the sample group with the low-frequency reference groups to search an actual shifting angle between the high-frequency carrier and the low-frequency carrier from the reference shifting angles; and performing a high-frequency carrier adjusting step to drive the proportional integral controller to calculate the actual shifting angle according to an adjusting procedure to generate a sync reference, and then drive the period counter to adjust a starting point of the high-frequency carrier according to the sync reference.

2. The carriers synchronizing method of the hybrid frequency parallel inverter of claim 1, further comprising:

performing a high-frequency carrier synchronizing step to drive the high-frequency controlling unit to re-execute the equidistant grid sampling step, the actual shifting angle searching step and the high-frequency carrier adjusting step according to the high-frequency carrier having been adjusted until the starting point of the high-frequency carrier at an instant cycle is equal to the starting point of the high-frequency carrier at a next cycle so as to synchronize the high-frequency carrier to the low-frequency carrier.

3. The carriers synchronizing method of the hybrid frequency parallel inverter of claim 1, wherein the low-frequency ripple simulating step comprises:

performing a current extracting step to drive the high-frequency controlling unit to extract an inductance current from a low-frequency inductance connected to the low-frequency high power inverter through a current sensor; and performing a data storing step to drive the high-frequency controlling unit to store a low-frequency duty ratio, a DC voltage and an output voltage corresponding to the low-frequency high power inverter;

wherein the high-frequency controlling unit calculates the inductance current, the low-frequency duty ratio, the DC voltage and the output voltage according to the simulating procedure to generate the low-frequency ripple.

4. The carriers synchronizing method of the hybrid frequency parallel inverter of claim 1, wherein the simulating procedure comprises a first turning point, a second turning point and a slope, the first turning point is represented as $[t_{t1}, i_{i,max}]$, the second turning point is represented as $[t_{t2}, i_{i,min}]$, and the slope is represented as $S_\pm$ and conforms to a following equation:

$$\begin{cases} t_{t1} = \dfrac{T_{sL} D_{LF}[n+1]}{2} \\ i_{i,max} = t_t * S \end{cases} ;$$

$$\begin{cases} t_{t2} = T_{sL} - t_{t1} \\ i_{i,min} = -i_{i,max} \end{cases} ;$$

$$S_\pm = \dfrac{(\pm V_{DC}[n] - v_{ck}[n])}{L_{iL}} - \dfrac{\Delta i_i[n]}{T_{sL}} ;$$

wherein $t_{t1}$ is a first moment of the slope turning, $t_{t2}$ is a second moment of the slope turning, $i_{i,max}$ is a maximum current value of the low-frequency ripple, $i_{i,min}$ is a minimum current value of the low-frequency ripple, S is a positive value of the slope, $T_{sL}$ is a low-frequency ripple period, $D_{LF}$ is a low-frequency duty ratio, N is a given period, $V_{DC}$ is a DC voltage, $V_{ck}$ is an output voltage, $\Delta i_i$ is an inductance current difference, and $L_{iL}$ is an inductance value.

5. The carriers synchronizing method of the hybrid frequency parallel inverter of claim 1, wherein the equidistant grid sampling step comprises:

performing a sample ripple shifting step to drive the high-frequency controlling unit to shift a plurality of sample points of the sample ripple according to the equidistant grid, wherein the sample points are the sample group; and performing a reference point forming step to drive the high-frequency controlling unit to form a plurality of reference points from the low-frequency ripple corresponding to each of the reference shifting angles according to the equidistant grid, wherein the reference points corresponding to each of the reference shifting angles are each of the low-frequency reference groups.

6. The carriers synchronizing method of the hybrid frequency parallel inverter of claim 1, wherein in the actual shifting angle searching step, the sample group comprises a plurality of sample points, the sample points correspond to a sample vector, each of the low-frequency reference groups comprises a plurality of reference points, the reference points correspond to a reference vector, and the high-frequency controlling unit performs an inner-product operation on the sample vector and a plurality of the reference vectors of the low-frequency reference groups according to a binary search algorithm to find and select one of the reference shifting angles resulting to a largest inner-product as the actual shifting angle.

7. The carriers synchronizing method of the hybrid frequency parallel inverter of claim 1, wherein the adjusting procedure comprises the sync reference, the actual shifting angle and an integral gain, the sync reference is represented as Sref, the actual shifting angle is represented as θ, and the integral gain is represented as $K_i$ and conforms to a following equation:

$$Sref[n]=Sref[n-1]+K_i(180°-2\theta);$$

wherein n is a given period.

8. A carriers synchronizing system of a hybrid frequency parallel inverter, which is configured to synchronize a high-frequency carrier to a low-frequency carrier, the carriers synchronizing system of the hybrid frequency parallel inverter comprising:
  a low-frequency high power inverter;
  a low-frequency controlling unit electrically connected to and controlling the low-frequency high power inverter, wherein the low-frequency controlling unit is configured to generate the low-frequency carrier;
  a high-frequency low power inverter connected to the low-frequency high power inverter in parallel; and
  a high-frequency controlling unit electrically connected to and controlling the high-frequency low power inverter, wherein the high-frequency controlling unit comprises a proportional integral controller and a period counter and stores a sample ripple, the period counter is configured to generate the high-frequency carrier, and the high-frequency controlling unit is configured to implement a carriers synchronizing method of the hybrid frequency parallel inverter comprising:
    performing a low-frequency ripple simulating step to simulate a low-frequency ripple corresponding to the low-frequency high power inverter according to a simulating procedure;
    performing an equidistant grid sampling step to sample the sample ripple according to an equidistant grid to generate a sample group and sample the low-frequency ripple according to the equidistant grid and a plurality of reference shifting angles to generate a plurality of low-frequency reference groups, wherein the low-frequency reference groups correspond to the reference shifting angles, respectively;
    performing an actual shifting angle searching step to compare the sample group with the low-frequency reference groups to search an actual shifting angle between the high-frequency carrier and the low-frequency carrier from the reference shifting angles; and
    performing a high-frequency carrier adjusting step to drive the proportional integral controller to calculate the actual shifting angle according to an adjusting procedure to generate a sync reference, and then drive the period counter to adjust a starting point of the high-frequency carrier according to the sync reference.

9. The carriers synchronizing system of the hybrid frequency parallel inverter of claim 8, wherein the carriers synchronizing method of the hybrid frequency parallel inverter further comprises:
  performing a high-frequency carrier synchronizing step to re-execute the equidistant grid sampling step, the actual shifting angle searching step and the high-frequency carrier adjusting step according to the high-frequency carrier having been adjusted until the starting point of the high-frequency carrier at an instant cycle is equal to the starting point of the high-frequency carrier at a next cycle so as to synchronize the high-frequency carrier to the low-frequency carrier.

10. The carriers synchronizing system of the hybrid frequency parallel inverter of claim 8, wherein the low-frequency ripple simulating step comprises:
  performing a current extracting step to drive the high-frequency controlling unit to extract an inductance current from a low-frequency inductance connected to the low-frequency high power inverter through a current sensor; and
  performing a data storing step to drive the high-frequency controlling unit to store a low-frequency duty ratio, a DC voltage and an output voltage corresponding to the low-frequency high power inverter;
  wherein the high-frequency controlling unit calculates the inductance current, the low-frequency duty ratio, the DC voltage and the output voltage according to the simulating procedure to generate the low-frequency ripple.

11. The carriers synchronizing system of the hybrid frequency parallel inverter of claim 8, wherein the simulating procedure comprises a first turning point, a second turning point and a slope, the first turning point is represented as $[t_{t1}, i_{i,max}]$, the second turning point is represented as $[t_{t2}, i_{i,min}]$, and the slope is represented as $S_\pm$ and conforms to a following equation:

$$\begin{cases} t_{t1}=\dfrac{T_{sL}D_{LF}[n+1]}{2} \\ i_{i,max}=t_{t1}*S \end{cases};$$

$$\begin{cases} t_{t2}=T_{sL}-t_{t1} \\ i_{i,min}=-i_{i,max} \end{cases};$$

$$S_\pm=\dfrac{(\pm V_{DC}[n]-v_{ck}[n])}{L_{iL}}-\dfrac{\Delta i_i[n]}{T_{sL}};$$

wherein $t_{t1}$ is a first moment of the slope turning, $t_{t2}$ is a second moment of the slope turning, $i_{i,max}$ is a maximum current value of the low-frequency ripple, $i_{i,min}$ is a minimum current value of the low-frequency ripple, S is a positive value of the slope, $T_{sL}$ is a low-frequency ripple period, $D_{LF}$ is a low-frequency duty ratio, n is a given period, $V_{DC}$ is a DC voltage, $V_{ck}$ is an output voltage, $\Delta i_i$ is an inductance current difference, and $L_{iL}$ is an inductance value.

12. The carriers synchronizing system of the hybrid frequency parallel inverter of claim 8, wherein the equidistant grid sampling step comprises:
  performing a sample ripple shifting step to drive the high-frequency controlling unit to shift a plurality of sample points of the sample ripple according to the equidistant grid, wherein the sample points are the sample group; and
  performing a reference point forming step to drive the high-frequency controlling unit to form a plurality of reference points from the low-frequency ripple corresponding to each of the reference shifting angles according to the equidistant grid, wherein the reference points corresponding to each of the reference shifting angles are each of the low-frequency reference groups.

13. The carriers synchronizing system of the hybrid frequency parallel inverter of claim 8, wherein in the actual shifting angle searching step, the sample group comprises a plurality of sample points, the sample points correspond to a sample vector, each of the low-frequency reference groups comprises a plurality of reference points, the reference points correspond to a reference vector, and the high-frequency controlling unit performs an inner-product operation on the sample vector and a plurality of the reference vectors of the low-frequency reference groups according to a binary search algorithm to find and select one of the reference shifting angles resulting to a largest inner-product as the actual shifting angle.

14. The carriers synchronizing system of the hybrid frequency parallel inverter of claim 8, wherein the adjusting procedure comprises the sync reference, the actual shifting angle and an integral gain, the sync reference is represented as Sref, the actual shifting angle is represented as $\theta$, and the integral gain is represented as $K_i$ and conforms to a following equation:

$$Sref[n]=Sref[n-1]+K_i(180°-2\theta);$$

wherein n is a given period.

* * * * *